United States Patent
Harley (10) Patent No.: US 10,351,359 B2
(45) Date of Patent: Jul. 16, 2019

(54) SYSTEM FOR QUICKLY DEPLOYING AND COLLECTING VISIBLE MARKERS

(71) Applicant: Alix Harley, Burlington (CA)

(72) Inventor: Alix Harley, Burlington (CA)

(*) Notice: Subject to any disclaimer, the term of this patent is extended or adjusted under 35 U.S.C. 154(b) by 0 days.

(21) Appl. No.: 16/124,311

(22) Filed: Sep. 7, 2018

(65) Prior Publication Data
US 2019/0077616 A1 Mar. 14, 2019

Related U.S. Application Data (60) Provisional application No. 62/555,787, filed on Sep. 8, 2017.

(51) Int. Cl.
| | |
|---|---|
| *B65G 57/30* | (2006.01) |
| *B65G 59/06* | (2006.01) |
| *G09F 17/00* | (2006.01) |
| *G09F 15/00* | (2006.01) |
| *G09F 7/18* | (2006.01) |
| *A63C 19/06* | (2006.01) |

(52) U.S. Cl.
CPC ......... *B65G 59/061* (2013.01); *B65G 57/30* (2013.01); *G09F 7/18* (2013.01); *G09F 15/0056* (2013.01); *G09F 17/00* (2013.01); *A63C 19/062* (2013.01); *G09F 2007/1804* (2013.01); *G09F 2017/0066* (2013.01)

(58) Field of Classification Search
CPC .. A63B 71/0036; A63C 19/062; B65G 57/30; B65G 59/061; E01F 9/70; G09F 17/00; G09F 2017/0066; G09F 15/0056
USPC ...... 294/26.5, 93, 158; 414/27, 790.2, 792.9
See application file for complete search history.

(56) References Cited

U.S. PATENT DOCUMENTS

| | | | | |
|---|---|---|---|---|
| 181,244 | A | * | 8/1876 | Campbell |
| 1,359,649 | A | * | 11/1920 | Allison ............... H01M 2/1005 220/760 |
| 1,697,063 | A | * | 1/1929 | Holland .............. H01M 2/1005 16/444 |
| 1,848,717 | A | * | 3/1932 | Heline .................... B65B 23/08 294/15 |
| 2,102,348 | A | * | 12/1937 | Balochi ................... A47J 47/16 294/145 |
| 3,861,733 | A | * | 1/1975 | Vander Mey ........... B08B 11/02 206/832 |
| 6,089,637 | A | * | 7/2000 | Brunelle .................. B65G 7/12 211/59.1 |
| 7,464,833 | B2 | * | 12/2008 | Goers .................... A63B 71/02 221/312 A |
| 2004/0159280 | A1 | * | 8/2004 | Mohelsky ............ A63C 19/062 116/63 C |

(Continued)

*Primary Examiner* — Dean J Kramer
(74) *Attorney, Agent, or Firm* — Aaron Edgar (57) ABSTRACT

A device for quickly deploying and collecting visible markers is disclosed. Visible markers can include a base that can support an upright flag for use in sports training, marketing, or traffic/emergency situations. The device for retaining the bases can be comprised of a frame having two vertical legs joined by a horizontal member, which can serve as a handle, at a top portion of each of the two vertical legs. A foot is attached to the bottom end of each of the two vertical legs, each of the feet are at an angle to the corresponding vertical leg to allow feet to be received in apertures of a base device and the angle of the feet retain the base device on the frame.

17 Claims, 7 Drawing Sheets

(56) References Cited

U.S. PATENT DOCUMENTS

| | | | |
|---|---|---|---|
| 2009/0236867 A1* | 9/2009 | Shepherd | A63C 19/062 294/158 |
| 2010/0251957 A1* | 10/2010 | Beattie | E01F 9/688 116/63 P |
| 2011/0133503 A1* | 6/2011 | Amato | B65G 7/12 294/158 |
| 2016/0207192 A1* | 7/2016 | Holland | B25J 1/04 |

* cited by examiner

SYSTEM FOR QUICKLY DEPLOYING AND COLLECTING VISIBLE MARKERS

FIELD

The present disclosure relates generally to visible markers that can be used in multiple contexts. More particularly, the disclosure relates to a system for quickly deploying and collecting a base that can support an upright flag for use in sports training.

BACKGROUND

In sports training, it is often desired to setup an obstacle or slalom course using cones, sticks, or flags for drills to improve speed, agility, and handling skills. For example, coaching sticks can be stuck into the ground of the soccer pitch in a slalom arrangement to practice dribbling the soccer ball through the course. It can be a time-consuming process to setup and tear down the course.

The existing training equipment also does not teach a heads-up approach to negotiating the obstacle course. Because cones, sticks, markers, or flags are secured to the playing surface, players can learn to negotiate the course with their heads down which is often a bad habit and decreases the player's awareness.

The ability to quickly deploy and collect flags can also be valuable in the marketing or display context. For example, a realtor may wish to have a system where they can setup a number of temporary flags advertising an open house. Traffic cones or pylons provide another example when it is desirable for road workers or emergency service operators to quickly deploy and collect the visible markers.

SUMMARY

Accordingly, there is a need for a system that can quickly deploy and collect visible markers, such as training obstacles, that can allow coaching staff to quickly setup and tear down an obstacle course. There is also a further need for a training obstacle that encourages a heads-up training approach.

In a first aspect, a device for deploying and collecting visible markers is disclosed. The device comprises a frame having two vertical legs joined by a first horizontal member, which can serve as a handle, at a top portion of each of the two vertical legs. A foot is attached to the bottom end of each of the two vertical legs and each of the feet are at an angle to the corresponding vertical leg so that each of the feet are receivable through a receiving apertures of a base device and the angle of the feet retain the base devices on the frame. The base retaining device further comprises a control member that is attached to frame and coupled to each of the feet in order to move each of the feet between a base retaining position and a base releasing position. The control member can be a second horizontal member located below the first horizontal member, and pulling the second horizontal member towards the first horizontal member can move the feet to the base releasing position. The vertical legs can be biased so that the feet are in the base retaining position when pressure is released from the control member. In some aspects, the device can have a protruding stopper near a top portion of each vertical leg to limit the number of base devices that can be retained on the frame. In other aspects, operation of the control member can cause the feet to be any one of withdrawn, retracted, or hinged to move feet between the base retaining position and the base releasing position.

In another aspect, the base devices can aid stacking by having a mating top and bottom surfaces. The base device can also have an alignment mechanism to align receiving apertures when the base device is placed on top of a second base device. For example, the alignment mechanism can be a channel or groove in the top or bottom surface of the base device. The circumferential surface of the base device can also be flared outwards to improve stacking density. In the preferred aspects, the base device defines a flag pole aperture to receive a flag pole having a flag. The flag pole can have a resilient lower portion to resist wind and impacts with the flag pole. The base device can also include a weight for increased stability and may also have a high friction bottom surface to help maintain the base device in position.

BRIEF DESCRIPTION OF THE DRAWINGS

For a better understanding of the various embodiments described herein and to show more clearly how they may be carried into effect, reference will now be made, by way of example only, to the accompanying drawings which show at least one exemplary embodiment, and in which.

DESCRIPTION OF VARIOUS EMBODIMENTS

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementations of various embodiments described herein.

Figure 1:
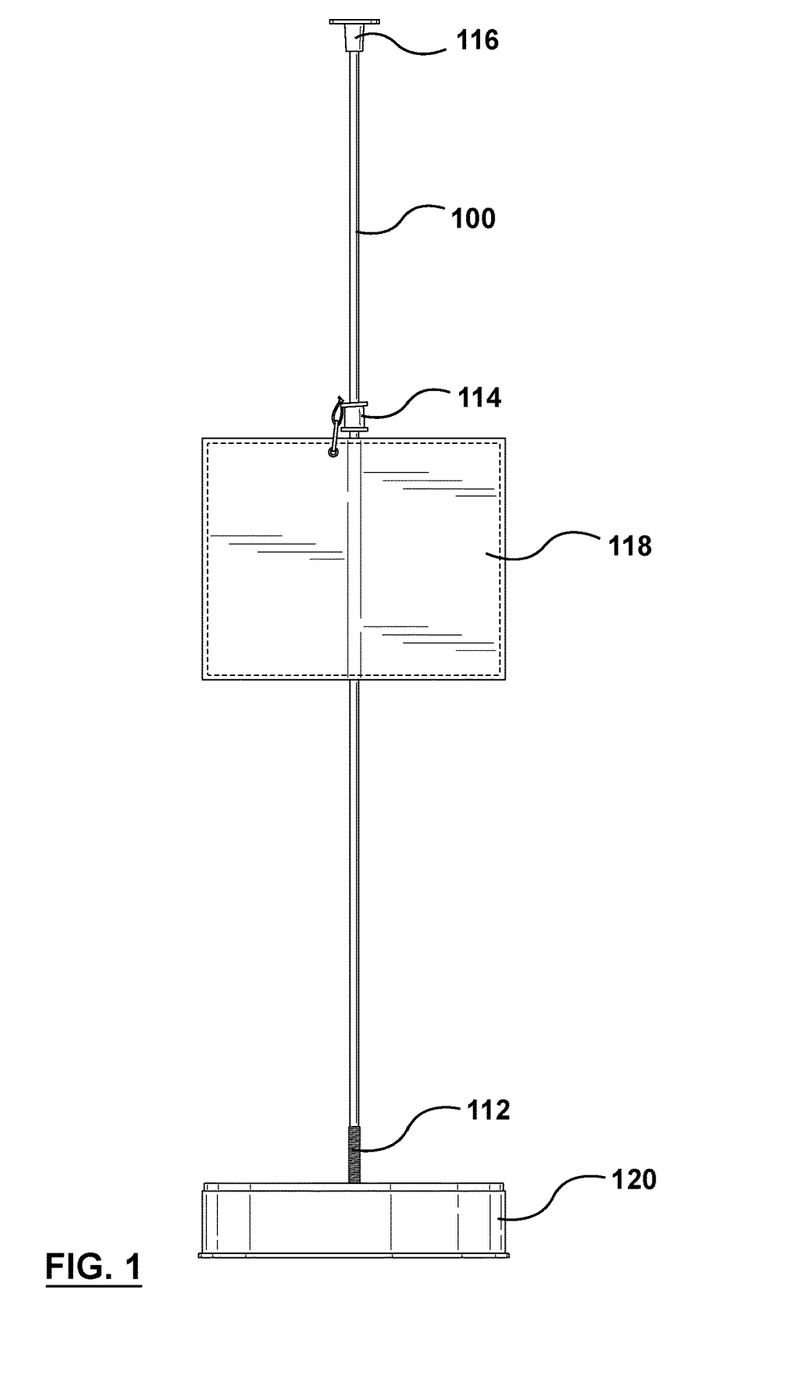
FIG. 1 is a front elevational view of a flag pole, flag, and base device.

Referring first to FIG. 1, shown is a front elevational view of a flag pole 100 having a flag 118 that is mounted in a moveable base 120. Flag pole 100 is mounted to moveable base 120 by the resilient lower portion 112 of flag pole 100. The term "moveable base" refers to the ability of bases to positioned where desired but once positioned, it is preferable, that moveable bases 120 remain in a fixed position. When used on ice, moveable base 120 can slide but has enough weight that it will not tip over and can withstand some contact without moving. If moveable base 120 is tipped over due to excessive force, it can easily be erected by grabbing the flag pole 100.

Resilient lower portion 112 can allow flag pole 100 to be impacted while minimizing damage to the user and flag pole 100. Resilient lower portion 112 would enable flag pole 100 to return to its original, typically vertical, position after being flexed by an impact or otherwise. Resilient lower portion 112 can also provide increased stability to moveable base 120 from the wind. In the embodiment illustrated in FIG. 1, a spring is used to provide the flexibility to the flexible lower portion 112. In alternate embodiments, resilient material could be used to construct lower portion 112. A protective cover 116 is affixed to the opposite end of the flag pole 100 from lower portion 112, providing protection for users from the end of the pole. In other embodiments, protective cover 116 can be integrated with flag pole 100 to provide a blunt top end.

Flag 118 is coupled to flag pole 100 and flag 118 can provide some type of information, such as a distinctive design, logo, symbol or instruction, for example. A number can be provided on flag 118 that can be used to indicate a stage of an obstacle course, for example. Preferably, flag 118 is positioned at the height of the player's chest or higher, so that the player must look forward rather than towards the ground. For example, if an obstacle course is set up using sequentially numbered flags, then a player must keep their gaze forward to determine which is the next ordered flag in the obstacle course.

Flag 118 can include a stiff, flexible inner support which functions to give shape and rigidity to flag 118 and the fabric material of flag 118 can be wrapped around the inner support. In an alternate embodiment, flag 118 may comprise a fabric material fit over a stiff, flexible frame of various shapes; a fabric material hanging from a horizontal stiff flexible member; or a rigid material of any shape, alone, comprising the flag. In some embodiments, flag 118 can include a clear envelope to allow for quick changes of the training information, such as, by inserting a sheet that contains an obstacle number or diagram, for example.

Flag 118 is preferably coupled to flag pole 100 to allow flag 118 to rotate about flag pole. This rotation function can be provided by way of an anti-furling device 114. Other embodiments can include a rotatable joint in flag pole 100 to allow entire flag pole 100 to rotate, such as from force from the flag 118.

Figure 2:
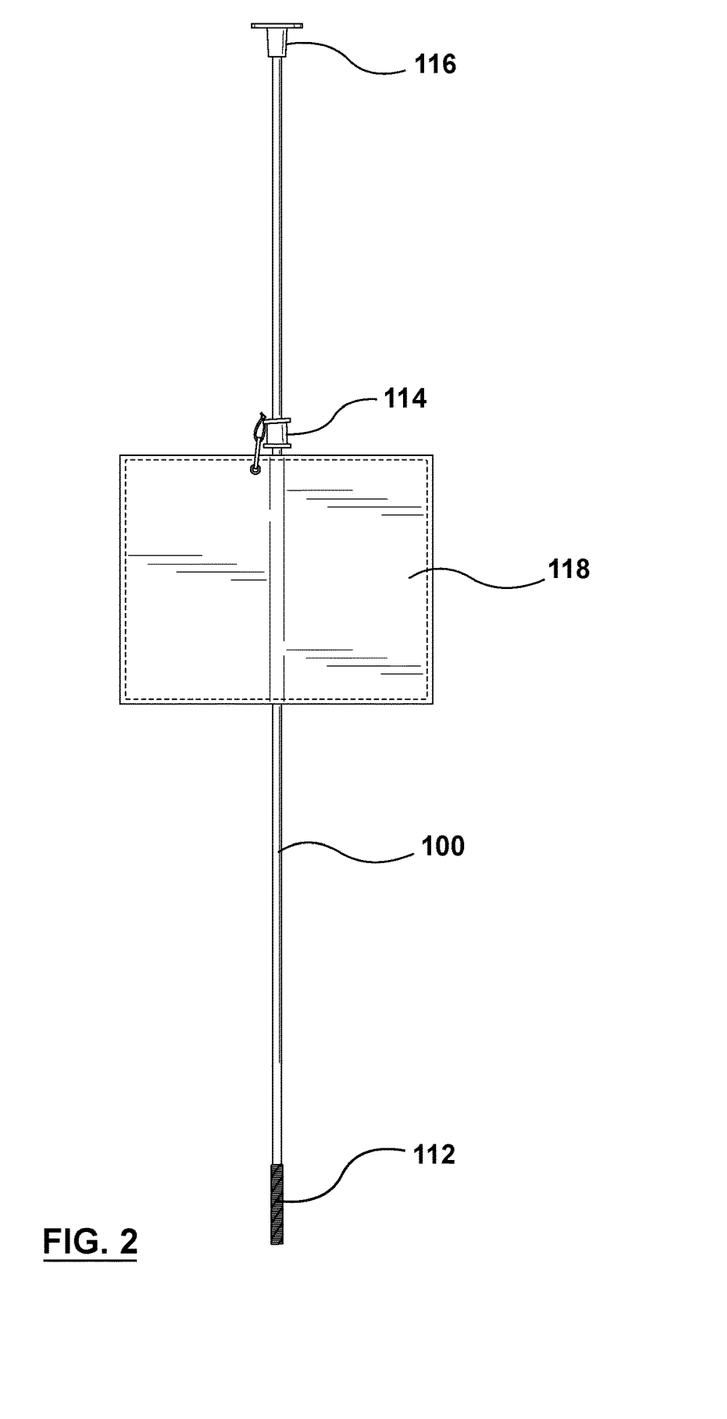
FIG. 2 is a front view of a flag pole and flag.

Referring to FIG. 2, shown is a front view of flag pole 100 and flag 118 removed from base 120. In an alternate embodiment, one or several stake devices may be affixed to the lower portion of the flag pole 100 to be inserted into the ground giving the flag pole 100 stability.

Figure 3:
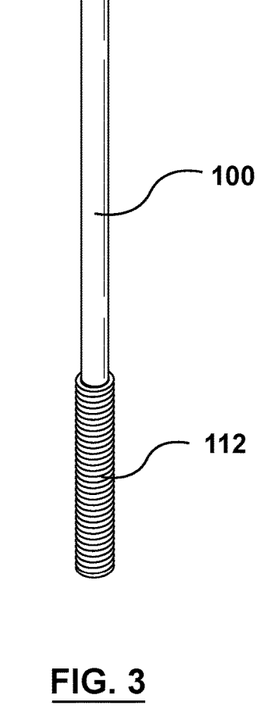
FIG. 3 is a front view of a lower resilient section of the flag pole of FIG. 2.

Referring now to FIG. 3, shown is resilient lower portion 112 of flag pole 100 that is implemented using a spring that is attached to the flag pole 100. In an alternative embodiment, the resilient lower portion 112 of flag pole 100 can be comprised of another resilient material.

Figure 4:
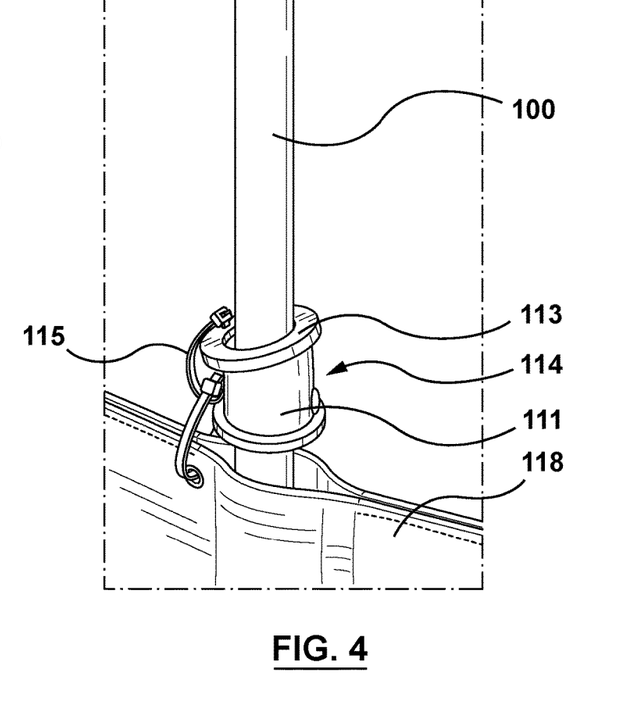
FIG. 4 is a view of an anti-furling device coupling the flag pole of FIG. 2 to the flag.

Referring next to FIG. 4, shown is anti-furling device 114 that can be used to couple flag 118 to flag pole 100 to allow rotation of flag 118 about flag pole 100. As shown in the embodiment of FIG. 4, anti-furling device 114 comprises tubular member 111 which is sized to be fit around flag pole 100 and is affixed to the flag pole 100 acting as a stopper for a freely rotating ring member 113 such that flag 118 does not fall towards the base 120. A tie 115 is used to couple freely rotating ring member 113 to flag 118. In an alternative embodiment, anti-furling device 114 could be affixed anywhere along the length of the flag pole and could consist of alternative means of coupling the flag 118 and flag pole 100, such as the flag 118 being hung from a ring affixed to the flag pole 100. In some embodiments, anti-furling device 114 can be attached to the top end of flag pole 100.

In some embodiments, if flag 118 is rigid or somewhat rigid, then the anti-furling device 114 is not required. A broad ring on flag pole 100 can be positioned to support a rigid flag 118 at the appropriate height. The rigid flag 118 can be allowed to freely rotate about the flag pole 100 or be in a fixed position with respect to flag pole 100.

Figure 5:
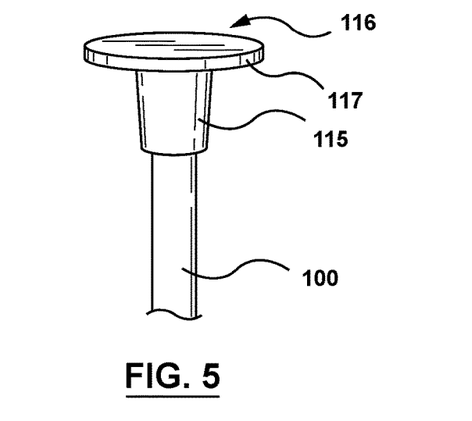
FIG. 5 is a front view of a protective cover of the flag pole of FIG. 2.

Referring next to FIG. 5, shown is protective cover 116 affixed to the top end of the flag pole 100. In the illustrated embodiment, the cover comprises a tubular member 115 sized to fit snugly around flag pole 100 abutted with a larger disc member 117 centered and sitting atop tubular member 115. Protective cover 116 serves as protection against the end of flag pole 100. In an alternate embodiment, the protective cover 116 could be of any shape and be made of a material such as foam to protect users from the end of flag pole 100. In other embodiments, top end of flag pole 100 can have a rounded end to help prevent injury to anyone making contact with top end of flag pole 100.

Figure 6:
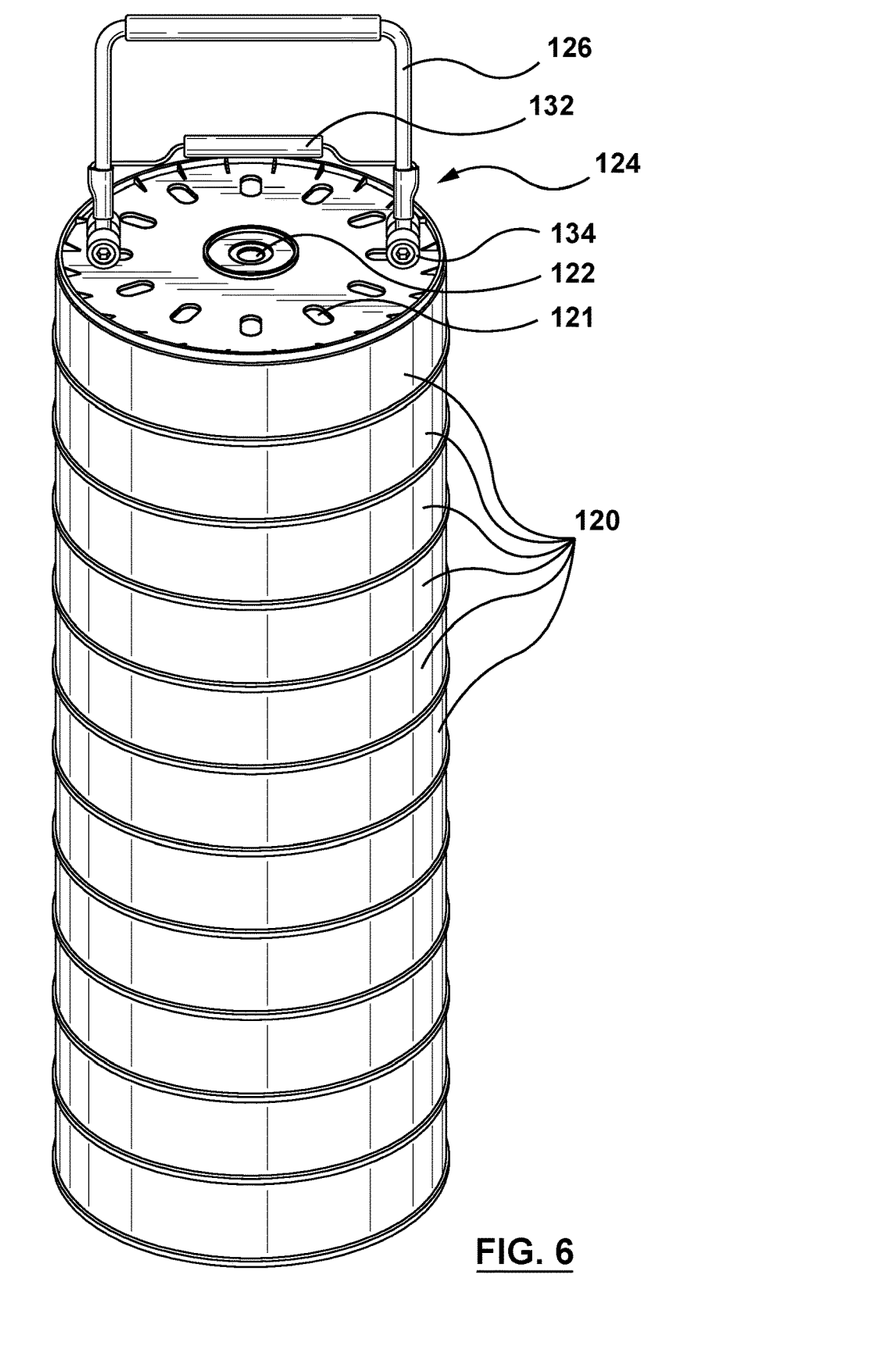
FIG. 6 is a front view of the stacked base received and retained by the base retaining device.

Now referring to FIG. 6, shown is a front perspective view of a base retaining device 124 that can hold multiple moveable bases 120. Base retaining device 124 includes two legs 126 each one of which slot through a corresponding receiving aperture 121 defined in moveable bases 120. Moveable bases 120 can stack on top of each other to allow receiving apertures 121 of moveable bases 120 to receive legs 126 of base retaining device 124. Moveable bases 120 can be stored and transported together using base retaining device 124.

A stopper member 134 can be affixed to each of legs 126 of base retaining device 124 that can serve to limit the number of moveable bases 120 that can be retained by base retaining device 124. Stopper member 134 can further prevent moveable base 120 from encumbering the horizontal control member 132, and can also provide tension to prevent movement of moveable bases 120 on legs 126 of base retaining device 124.

Figure 7:
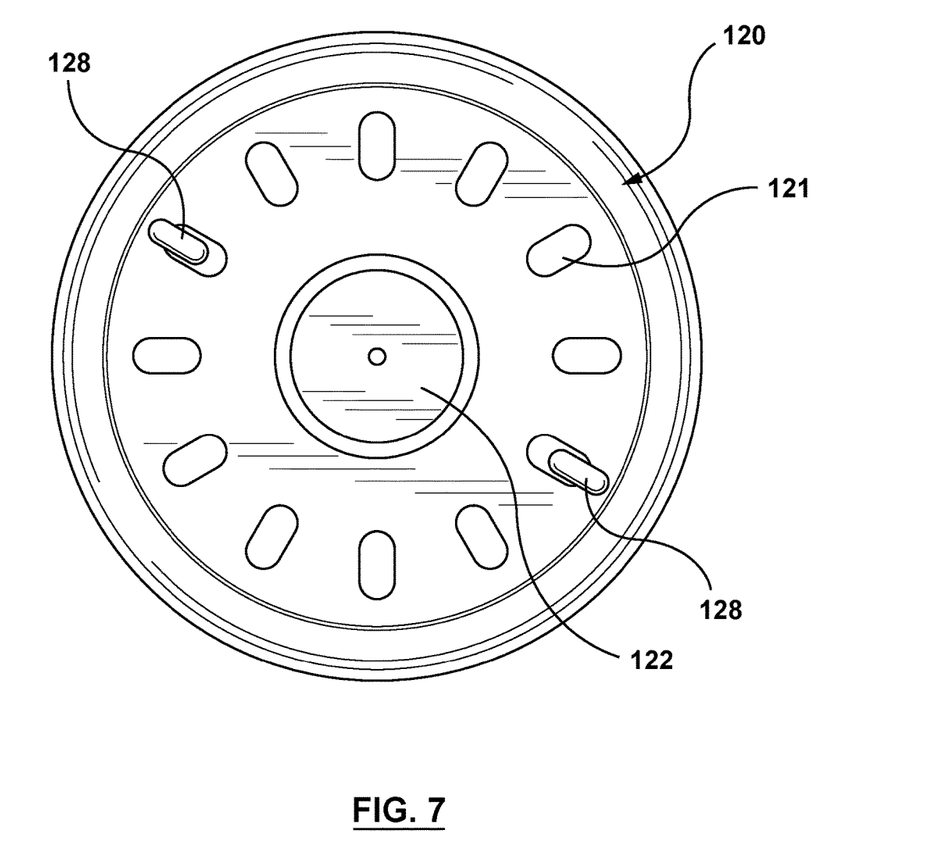
FIG. 7 is a bottom view of the base device.

Referring next to FIG. 7, shown is a bottom view of moveable base 120 showing several receiving apertures 121 arranged in a circular pattern around the center of moveable base 120. Receiving apertures 121 function to allow legs 126 of base retaining device 124 to slot through them enabling the stacking of base devices 120 in an aligned position. In alternate embodiments, receiving apertures 121 can be arranged in varying patterns or might consist of elongated slots through which legs 126 of base retaining device 124 may be received.

In other embodiments, moveable base 120 may only include two receiving apertures 121, and moveable base 120 will have an alignment mechanism that allows receiving apertures 121 to be aligned when one moveable base 120 is stacked on top of another moveable base. The alignment mechanism can be mating surfaces on the top and bottom surfaces of the moveable base 120, such as a channel or groove on the bottom surface and a mating protrusion on the top surface. The alignment mechanism can also be on the circumferential surface of moveable base 120 where it makes contact with a stacked moveable base 120 that is placed on top. Preferably, the circumferential surface of moveable base 120 is flared outwards to assist with alignment and provide tighter stacking density of moveable bases 120. Preferably the alignment mechanism provides some type of visual aid when viewing top surface of moveable base 120 to make it easier to stack.

Feet 128 are at the ends of each of legs 126 of base retaining device 124. Feet 128 retain moveable base 120 in place on legs 126, ensuring that they do not slide off the ends of legs 126 of base retaining device 124. Feet 128 are somewhat perpendicular to legs 126 and can face either inwards, outwards, or circumferentially depending on how feet 128 are biased to retain moveable base 120. In the embodiment illustrated in FIG. 7, feet 128 can be converged toward each other such that feet 128 align with the apertures 121 to release the base devices 120 from the legs 126 of the base retaining device. In the present embodiment, the movement of feet 128 is controlled by a control member 132 but could be controlled by other means in an alternate embodiment.

Moveable base 120 can also include a weight 122 that serves to stabilize moveable base 120 and can also provide for mounting of flag pole 100. In an alternate embodiment, moveable base 120 may be comprised of a heavier material and not require extra weighting. Weight 122 can include a container filled with water or sand or another material to act as a weight to stabilize moveable base 120 and flag pole 100. For example, one embodiment could include a simple rigid tube that accepts flag pole 100 and the weight 122 can be recycled rubber that is attached with an adhesive around the outer diameter.

Alternatively, one or several stake members may be affixed to moveable base 120 to be inserted into the ground in order to provide stability. In some embodiments, moveable base 120 can include teeth or a high friction material, such as rubber for example, on the bottom surface of moveable base 120 that engages with the ground (or other surface, such as ice, upon which moveable base 120 sits).

Figure 8:
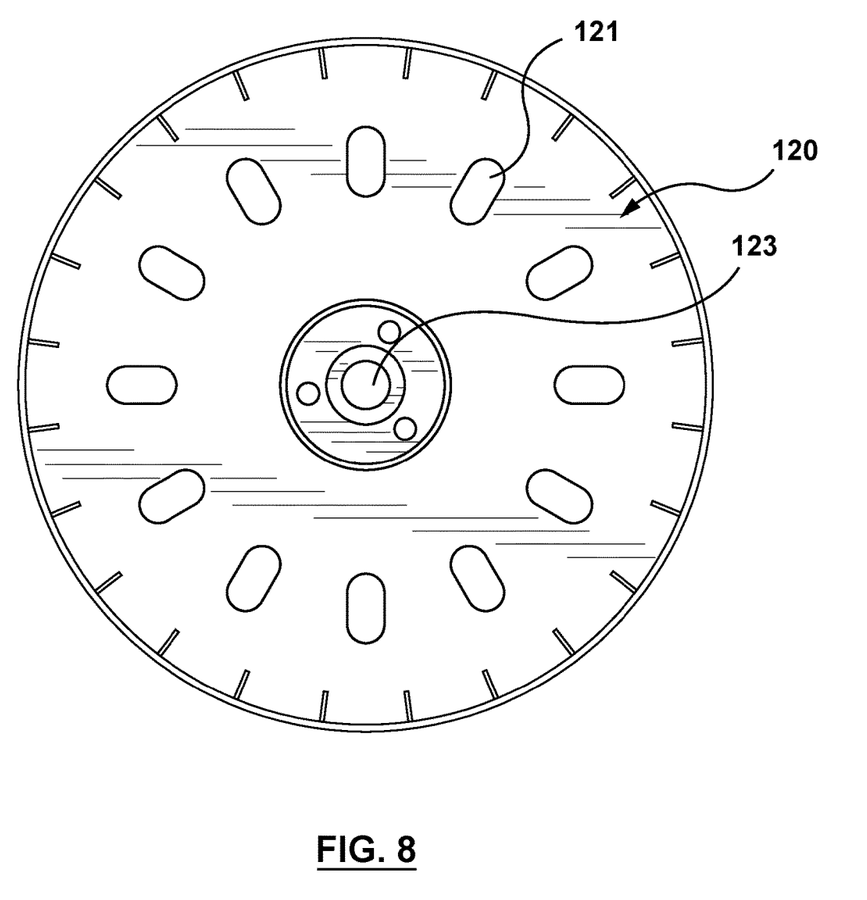
FIG. 8 is a top view of the base device.

Referring next to FIG. 8, a top view of moveable base 120 is shown illustrating receiving apertures 121. Top surface of moveable base 120 further includes a flag pole aperture 123 to receive the flag pole 100. In the present embodiment, flag pole aperture 123 allows the lower portion of flag pole 100 to be inserted to maintain flag pole 100 in a vertical position in a compression fit. In an alternative embodiment, flag pole aperture 123 can be threaded to mate with a correspondingly threaded lower portion of flag pole 100 to fixedly attach flag pole 100 to moveable base 120.

Figure 9:
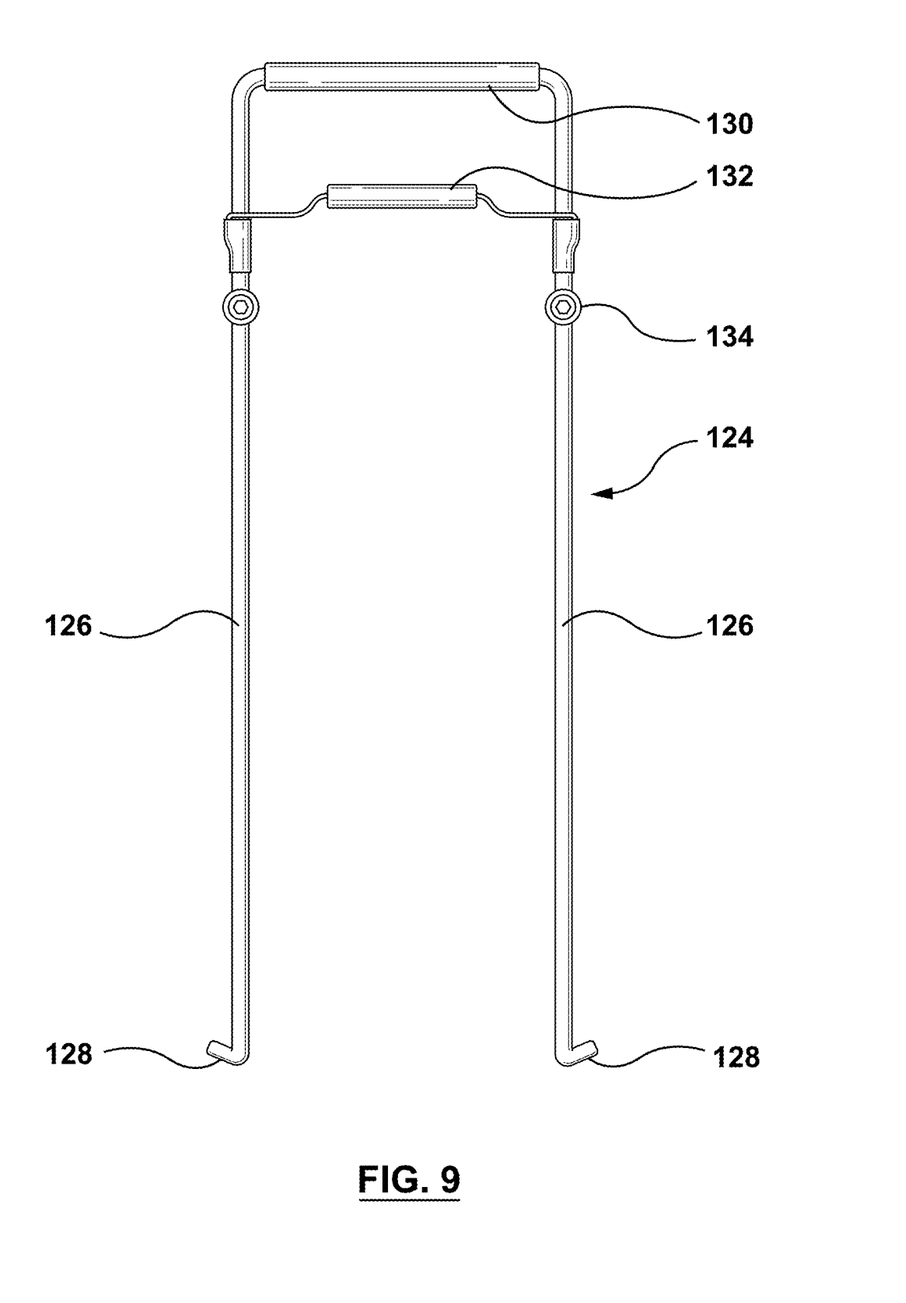
FIG. 9 is a front view of the base retaining device.

Referring now to FIG. 9, a front perspective of base retaining device 124 is shown without movable bases 120 attached. Base retaining device 124 comprises a frame serving to accommodate several of the base devices 120 in a vertical stacked configuration. In this manner, base retaining device 124 can be used to deploy and collect visible markers, such as moveable bases 120. The frame can have round, flat or cross (i.e. like an addition symbol) cross-section. In the embodiment shown, a continuous tube member forming a u-shape with two vertical elongated legs 126 and a horizontal member 130 connecting each of legs 126 at a top portion or at their top ends. The horizontal member 130 may serve as a handle for base retaining device. The vertical legs 126 are spaced such that both will be received into receiving apertures 121 in the base devices 120.

A protruding stopper 134 can be affixed to each vertical leg 126 that serves to limit the number of base devices 120 that can be retained by the base retaining device 124, and stopper 134 can also prevent moveable bases 120 impinging on horizontal member 130 or control member 132 which would prevent operation of base retaining device 124. In an alternative embodiment, another horizontal member may be attached between the two vertical legs to act as stopper 134 in order to limit the number of moveable bases 120 that can be retained on base retaining device 124.

Feet 128 are attached to the bottom end of each of the vertical legs 126. Each foot 128 forms an angle with its corresponding vertical leg 126. The angle of feet 128 with vertical legs 126 allows a moveable base 120 to be retained upon feet of vertical legs as illustrated in FIG. 7. Preferably, feet 128 form an acute angle with vertical legs 126 as shown in FIG. 9. This allows downwards pressure by feet 128 upon the edges of receiving apertures 121 to cause vertical legs 126 to move inwards (towards one another), and once feet 128 have passed through receiving apertures 121, feet 128 will be biased outwards against receiving apertures 121 to maintain movable base 120 upon vertical legs 126. This makes the collecting operation of using base retaining device 124 to simply require pressing base retaining device 124 down upon a movable base 120. Alternatively, if the top surface of movable base 120 surrounding the receiving apertures 121 is concave or angled downwards towards receiving apertures, a similar inward force will be applied to move vertical legs 126 inwards so feet 128 can pass through receiving apertures 121.

Base retaining device 124 can also include a control member 132 that can be used to release or accept a moveable base 120 onto base retaining device 124. Control member 132 illustrated in FIG. 9 is a second horizontal member 132 located below the first horizontal member 130. The second horizontal member 132 can be pulled towards the first horizontal member 130 to move the feet to a base releasing position. This causes vertical legs 126 to converge towards one another and feet 128 will be in position to disengage with apertures 121 of moveable base 120 from base retaining device 124 or accept a moveable base 120 onto base retaining device. When pressure is released from control member 132, vertical legs 126 will be biased outwards so that feet 128 can engage the outer edge of receiving apertures 121 of moveable base 120 to attach moveable base 120 to base retaining device 124.

In operation, base retaining device 124 can have multiple moveable bases 120 as illustrated in FIG. 6. Each moveable base 120 can be deployed by activating control member 132 to release a single moveable base 120 in the proper position. After being deployed, a flag pole 100 can be inserted into receiving aperture 122. All remaining moveable bases 120 on base retaining device 124 can be similarly deployed. Moveable bases 120 can then be similarly collected by removing flag pole 100 and positioning feet 128 above receiving apertures 121, activating control member 132 (or simply pressing down if feet 128 are at an acute angle to vertical legs 126), moving feet 128 through receiving apertures 121, and finally releasing control member 132 to allow feet to move to a base retaining position where feet 128 engage with the receiving apertures 121.

In an alternative embodiment, the outward facing feet 128 may be controlled by the user by way of a mechanical means enabling the outward facing feet 128 to be withdrawn, retracted, hinged, or otherwise arranged in order to receive the base devices 120 on the vertical legs 126 and to allow them to slide on and off the vertical legs 126. In these alternative embodiment, control member 132 can be used to activate outward facing feet 128 between a base retaining position and a base releasing position.

The invention claimed is:
1. A system for deploying and collecting visible markers, the system comprising:
    one or more base devices having receiving apertures defined in a top surface of the one or more base devices; and
    a base retaining device comprising:
        a frame having two vertical legs joined by a first horizontal member at a top portion of each of the two vertical legs;

a foot attached to the bottom end of each of the two vertical legs, each of the feet at an acute angle to the corresponding vertical leg, each of the feet receivable through the receiving apertures of the one or more base devices and the angle of the feet retain the one or more base devices on the frame, wherein downward pressure by the feet upon an edge of the receiving apertures causes the vertical legs to move inwards towards each other to allow the feet to pass through corresponding receiving apertures; and a control member attached to the frame, the control member coupled to each of the feet to move each of the feet between a base retaining position and a base releasing position, and wherein the control member is a second horizontal member located below the first horizontal member, and wherein pulling the second horizontal member towards the first horizontal member moves the feet to the base releasing position.

2. The system of claim 1 wherein the vertical legs of the base retaining device are biased so that the feet are in the base retaining position when pressure is released from the second horizontal member.

3. The system of claim 1 wherein first horizontal member further comprises a handle.

4. The system of claim 1 wherein the base retaining device further comprises a protruding stopper near a top portion of each vertical leg to limit a quantity of base devices that can be retained on the frame.

5. The system of claim 1 wherein operation of the control member causes feet to be any one of withdrawn, retracted, or hinged to move feet between the base retaining position and the base releasing position.

6. A system for deploying and collecting visible markers, the system comprising:
one or more base devices having receiving apertures defined in a top surface of the one or more base devices, wherein the one or more base devices are stackable, the one or more base devices each having a mating top and bottom surfaces, and
a base retaining device comprising:
a frame having two vertical leas joined by a first horizontal member at a top portion of each of the two vertical legs; and
a foot attached to the bottom end of each of the two vertical legs, each of the feet at an acute angle to the corresponding vertical leg, each of the feet receivable through the receiving apertures of the one or more base devices and the angle of the feet retain the one or more base devices on the frame, wherein downward pressure by the feet upon an edge of the receiving apertures causes the vertical legs to move inwards towards each other to allow the feet to pass through corresponding receiving apertures.

7. The system of claim 6 wherein a circumferential surface of the one ore more base devices are flared outwards to improve stacking density.

8. The system of claim 6 wherein the one or more base devices each define a flag pole aperture to receive a flag pole having a flag.

9. The system of claim 8 wherein the flag pole has a resilient lower portion.

10. The system of claim 6 wherein the one or more base devices are further comprised of a weight.

11. The system of claim 6 wherein the one or more base devices have a bottom surface with high friction.

12. A system for deploying and collecting visible markers, the system comprising:
one or more base devices having receiving apertures defined in a top surface of the one or more base devices, wherein the one or more base devices further comprise an alignment mechanism to align the receiving apertures when the one or more base devices are stacked on one another; and
a base retaining device comprising:
a frame having two vertical legs joined by a first horizontal member at a top portion of each of the two vertical legs; and
a foot attached to the bottom end of each of the two vertical legs, each of the feet at an acute angle to the corresponding vertical leg, each of the feet receivable through the receiving apertures of the one or more base devices and the angle of the feet retain the one or more base devices on the frame, wherein downward pressure by the feet upon an edge of the receiving apertures causes the vertical legs to move inwards towards each other to allow the feet to pass through corresponding receiving apertures.

13. The system of claim 12 wherein the alignment mechanism is any one of a channel or groove in the top or bottom surface of the one or more base devices.

14. The system of claim 12 wherein the one or more base devices each define a flag pole aperture to receive a flag pole having a flag.

15. The system of claim 14 wherein the flag pole has a resilient lower portion.

16. The system of claim 12 wherein the one or more base devices are further comprised of a weight.

17. The system of claim 12 wherein the one or more base devices have a bottom surface with high friction.

* * * * *